United States Patent [19]

Takeda et al.

[11] 4,094,056
[45] June 13, 1978

[54] DECORATIVE TRIM STRIP

[75] Inventors: Shinji Takeda; Shoji Kobayashi; Yutaka Watanabe, all of Kariya, Japan

[73] Assignee: Aisin Seiki Kabushiki Kaisha, Kariya, Japan

[21] Appl. No.: 773,757

[22] Filed: Mar. 2, 1977

[30] Foreign Application Priority Data

Aug. 20, 1976 Japan .................................. 51-99481

[51] Int. Cl.² ............................ B21D 5/06; B29F 3/00
[52] U.S. Cl. ............................. 29/527.2; 29/DIG. 33; 72/46
[58] Field of Search ................... 29/527.2, 155 R, 417, 29/DIG. 33; 156/244; 72/46

[56] References Cited

U.S. PATENT DOCUMENTS

| | | | |
|---|---|---|---|
| 3,232,818 | 2/1966 | Loew et al. | 156/244 X |
| 3,274,679 | 9/1966 | Kennedy | 29/527.2 X |
| 3,811,989 | 5/1974 | Hearn | 156/244 X |
| 3,813,199 | 5/1974 | Friesner | 156/244 X |
| 3,881,338 | 5/1975 | Tischuk | 29/DIG. 33 |

Primary Examiner—Milton S. Mehr
Attorney, Agent, or Firm—Finnegan, Henderson, Farabow & Garrett

[57] ABSTRACT

A process for forming a decorative trim strip by extruding a thermoplastic material around a continuous length of metal strip. The thermoplastic material is shaped with longitudinal grooves and when the strip is bent along the groove, the thermoplastic material on opposite sides of the grooves comes into contact. The strip is heated and the thermoplastic material in contact fuses to essentially eliminate the grooves.

7 Claims, 4 Drawing Figures

DECORATIVE TRIM STRIP

BACKGROUND OF THE INVENTION

The present invention relates generally to a process for forming decorative trim strip.

The prior art discloses several processes of forming decorative trim strip where metal strip or metal foil is passed through an extrusion die together with thermoplastic material. The thermoplastic material forms a layer on both sides of the metal strip or foil to form a composite strip. The composite strip, with the metal layer embedded between the layers of thermoplastic material, is then formed into a shaped composite strip of a desired cross section by passage through conventional shaping means such as nipping and forming rolls.

In such processes, the metal component may be coated on one or both sides with an adhesive that is compatible with the surrounding thermoplastic material prior to its passage through the extrusion die where the thermoplastic material is deposited.

The material used for the metal strip or foil is usually stainless steel or aluminum. The thermoplastic material is normally clear polyvinyl chloride (PVC), cellulose acetate butyrate (CAB), or the like.

In such conventional processes, however, there is difficulty in forming decorative trim strip having acute angles or complicated cross sectional shapes. This is caused by increasing resistance generated by the extrudate as it is passed through successive forming rolls. In order to form a decorative trim strip having a smooth surface and a uniform cross sectional shape, it is necessary, with such prior art processes, to restrict the shape of product to simple cross sectional shapes. For example, prior art processes can form uniform and smooth decorative trim strips having C-shaped or shallow V-shaped cross sections without significant difficulty. Such shapes are capable of being readily formed from the composite layered strip without the forming process generating excessive resistance that would detrimentally affect the product.

It, however, the metal layer is stainless steel or if the thickness of the thermoplastic material is excessive, even these simple shapes may be difficult to form with the desired quality. This is due to the greater resistance these materials generate when subjected to forming.

The present invention is a significant improvement over such prior art processes because it significantly reduces the resistance of the composite strip to forming operations. By reducing the resistance to forming the present invention, it allows more complex cross sectional shapes to be produced or allows the use of stronger metal layers. In addition, the thermoplastic material used to form the strip can be thicker or stronger without detrimentally affecting the final shaping processes.

Additional advantages of the invention will be set forth in part in the description which follows, and in part will be obvious from the description or may be learned by practice of the invention. The advantages of the invention may be realized and attained by means of the instrumentalities and combinations particularly set out in the appended claims.

SUMMARY OF THE INVENTION

In accordance with the purposes of the invention, as embodied and broadly described herein, the present invention is a process for forming a decorative strip. The decorative strip is formed from an elongated metal strip with thermoplastic material affixed to the strip. A continuous length of the metal strip is transported from a supply. The metal strip is passed through a device where the thermoplastic material is extruded to surround the metal strip. The thermoplastic material is then formed into a first predetermined cross sectional shape that includes at least one longitudinal groove. The strip, and the surrounding thermoplastic material, is then sequentially shaped into a second predetermined cross sectional shape by bending the metal strip longitudinally adjacent the root of the groove(s) in the thermoplastic material. This closes the grooves and an associated heating step induces fusion of the material on one side of the groove in contact with material on the other side of the groove.

Preferably, the process includes the step of applying adhesive to at least one side of the metal strip before the thermoplastic material is extruded onto the strip.

It is also preferred to apply adhesive to only one side of the metal strip. In this variant of the process, only the thermoplastic material on the side of the strip receiving the adhesive also receives the grooves. The material on the opposite side of the metal strip is subsequently removed to expose the surface of the strip not receiving the adhesive. Preferably, this variant of the present invention utilizes a metal strip of stainless steel.

BRIEF DESCRIPTION OF THE DRAWINGS

The accompanying drawings, which are incorporated in and constitute a part of this specification, illustrate an embodiment of the invention and together with the description, serve to explain the principles of the invention.

Of the drawings.

DESCRIPTION OF THE PREFERRED EMBODIMENTS

Figure 2:
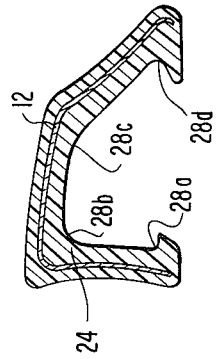
FIG. 2 is a cross sectional view of a product formed according to the present invention.
Figure 1:
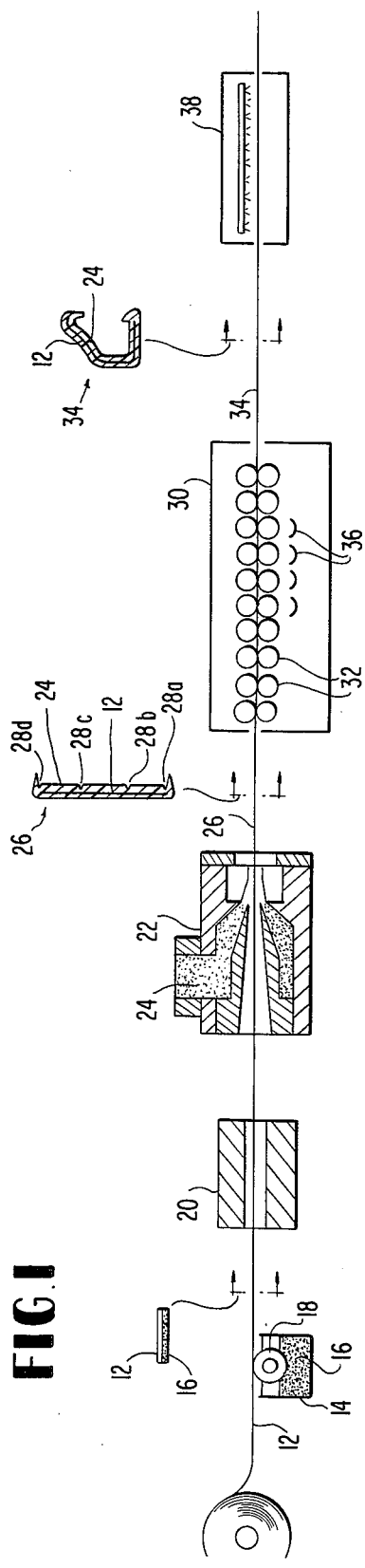
FIG. 1 is a schematic view illustrating an apparatus for producing the composite decorative trim strip according to the present invention.
Figure 3:
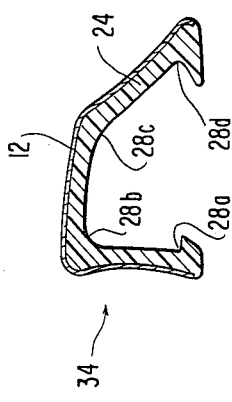
FIG. 3 is a cross sectional view of another product formed according to the present invention.

Reference will now be made in detail to the preferred embodiments of the invention, examples of which are illustrated in FIGS. 1 through 3 of the accompanying drawings.

An apparatus for forming decorative trim strip from an elongated metal strip and thermoplastic material according to the present invention is shown schematically in FIG. 1.

In accordance with the invention, there is provided a strip supply means shown in FIG. 1 as the roll 10 of continuous metal strip 12. The metal strip 10 may be stainless steel foil of a thickness of from 0.08 to 0.1 mm. or aluminum of a thickness of about 0.08 mm. The metal strip or foil is supplied and transported from the strip supply means 10.

In embodiments for carrying out the process of the invention that also include the preferred step of applying adhesive to the metal strip, there are provided means for applying adhesive to at least one side of the metal strip. In the embodiment depicted in FIG. 1, there is an adhesive 16 with an applicating roll 18 in contact with both the metal strip 12 and the adhesive 16. The foil 18 picks up adhesive 16 and applys it to the lower surface of the strip 12. Above the adhesive applicator 14 is an enlarged schematic cross section of the strip 12 as it leaves the adhesive applicator 14. Although the disclosed embodiment shows the application of adhesive to only one side of the strip 12, it should be apparent that the adhesive could be applied to both sides of the metal strip.

Where the metal strip 12 is to be totally surrounded by the thermoplastic material in the final product, adhesive is preferably applied to both sides of the metal strip. In such an embodiment, which is shown in cross section in FIG. 3, it is preferred that the metal strip 12 consist essentially of aluminum.

Where the metal strip 12 receives adhesive only on one side, then the thermoplastic material applied to the other side can be removed to expose the surface of the metal strip not receiving the adhesive. This type of product is depicted in cross section in FIG. 2. Preferably, the metal strip used in this variant of the process is stainless steel.

It is also preferred, when applying adhesive to the metal strip, that the adhesive be dried before subsequent operations on the strip. As here embodied, there is an adhesive dryer 20 that receives the strip 12 with adhesive 16 thereon.

In accordance with the invention, the next step of the process is extruding thermoplastic material onto the strip as it is being transported. Preferably, the strip is surrounded by the thermoplastic material as the result of the extrusion process. The thermoplastic material may also be applied to just one side of the metal strip or only to portions of the metal strip.

In FIG. 1, there is shown an extruder 22 that forces thermoplastic material 24 onto and around the metal strip 12 to form the composite strip 26. One skilled in the art needs no teaching of the means or steps necessary to extrude the thermoplastic material onto the initial strip. With one major exception to be discussed in a subsequent portion of the present specification, the extruder 22, used in the process of the present invention, is similar to those used in the prior art and depicted in FIG. 4 as the extruder 22'. The differences in the extruders are the result of an additional process step necessary in the present invention.

In accordance with the invention, the process includes forming the thermoplastic material around the metal strip to a first predetermined cross sectional shape that includes at least one longitudinal groove in the thermoplastic material.

In FIG. 1, downstream from the extruder 22 and above the composite strip 26, is a schematic cross sectional view of the composite strip 26, formed with a plurality of grooves 28 in the thermoplastic material 24. By contrast, a similar cross sectional view of the composite strip 26' from the prior art extruder 22', shown in FIG. 4, does not show grooves within the thermoplastic material 24. The function of the grooves will be more fully disclosed hereinafter.

Practice of the present invention has resulted in the determination of several preferred combinations of materials. When stainless steel foil or aluminum foil is used as the metal strip 12, rigid polyvinyl chloride (PVC), acrylonitrile butadiene styrene (ABS), or the like is used on the side of the composite strip 26, receiving the grooves 28. When stainless steel foil is only partially covered (on the side of the composite strip 26, opposite that receiving the grooves 28), the side opposite that receiving the grooves is preferably flexible PVC, ABS, flexible cellulose acetate butyrate (CAB) or the like. When the metal layer 12 is aluminum then it is preferred that the thermoplastic material 24 on the side opposite the grooves 28 be comprised of clear CAB, clear PVC or the like.

In accordance with the invention, the strip and the thermoplastic material surrounding it are sequentially shaped to a second predetermined cross sectional shape. The metal strip is bent longitudinally at a location adjacent the roots of the grooves which closes the grooves.

As depicted in FIG. 1, there is provided a shaping section comprised of a plurality of pairs of forming and shaping rolls 32. The operation of the shaping section is conventional except that the product being formed offers significantly less resistance to forming pressures due to the presence of the grooves 28. The shaping section 30, and the associated pairs of shaping and forming rolls 32 are disposed to shape the composite strip 26 into the shaped composite strip 34, having a second predetermined shape depicted in cross section downstream and above the shaping section 30.

As seen in FIGS. 2 and 3, the metal strip 12 is bent primarily at locations adjacent the root of the grooves 28 in the thermoplastic material 24. In bending the strip 12 and the thermoplastic material 24 into the second predetermined cross sectional shape shown in FIGS. 2 and 3, the grooves 28 are closed with the thermoplastic material on each side of the groove coming into contact. The successive pairs of rolls 32 sequentially bend and crease the grooves in the composite strip 26, primarily at the grooves 28, to form the shaped composite strip 34.

In accordance with the invention, the shaping of the strip and thermoplastic material includes the step of heating the thermoplastic material to induce fusion of the material where the material comes into contact due to the closing of the grooves during shaping.

In FIG. 1, there are schematically depicted heating means 36 disposed to render the thermoplastic molten or self adherent to induce fusion of the thermoplastic material 24 in the grooves 28. Preferably, the heating means 36 are associated with the foils 32 of the shaping section 30 that are toward the rear or downstream portion of the shaping section.

FIGS. 2 and 3 show the location of the grooves 28 a-d that have been closed and eliminated by heat induced fusion of the thermoplastic material. The cross sectional shape of these two products of this present invention illustrate the complex shapes that can be formed as a result of the practice of the present invention. In addition, the products of FIGS. 2 and 3 illustrate the degree of bending of the metal strip 12 that can be accomplished as a result of the practice of the invention.

Preferably, the process of the present invention includes the step of cooling the thermoplastic material after the shaping step. As schematically shown in FIG. 1, there is provided a cooling means 38 downstream from the shaping means 30 that sprays the shaped composite strip 34 with a coolant to increase the rigidity of the thermoplastic material 24 so the shaped product will retain the desired cross sectional shape. Those skilled in the art can devise cooling means without a specific teaching in this specification.

When the metal strip 12 is stainless steel, the thermoplastic material may be removed from one side of the shaped composite strip. FIG. 2 shows such an embodiment with the thermoplastic material on the outer surface of the product removed to expose the stainless steel strip. In such an embodiment, the surface of the metal strip ultimately exposed does not receive adhesive. The embodiment of FIG. 1 depicts such a process with the applicating roll 18 only applying adhesive to one side of the metal strip 12. The superior strength and scratch resistance of stainless steel makes such an embodiment possible.

In embodiments where aluminum is the metal strip, the thermoplastic material is left surrounding the aluminum as shown in FIG. 3. In producing such a trim strip, the metal strip 12 would receive adhesive on both surfaces in the adhesive applicator prior to being introduced to extruder 22. While FIG. 1 does not illustrate such an embodiment, it is well within the capabilities of those skilled in the art to devise means for carrying out such a step without a specific teaching in the present specification.

Figure 4:
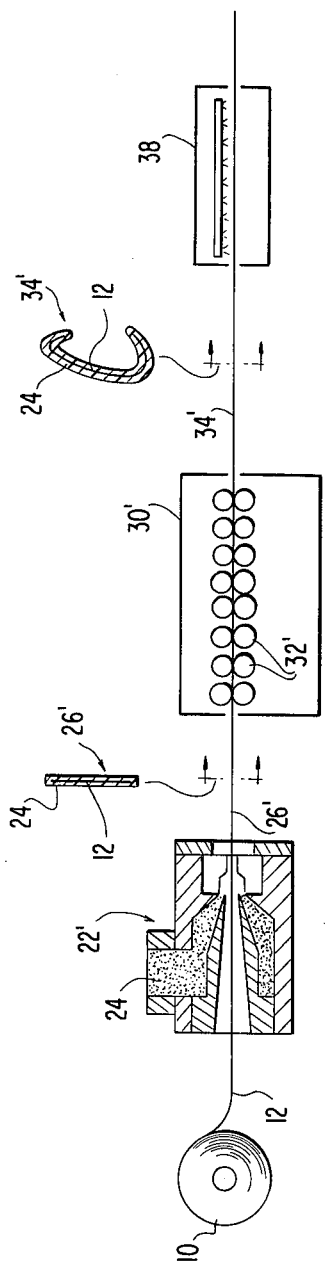
FIG. 4 schematically depicts a prior art process for producing composite decorative trim strip.

The prior art process, disclosed in analogous fashion to the present invention, is depicted in FIG. 4. The metal strip 12 is supplied from a strip supply means shown here as the foil 10. The strip 12 is introduced to an extruder 22' that differs in two ways from extruder 22 of FIG. 1 and the present invention. First, in the prior art process, the thermoplastic material 24 must be applied to the metal strip 12 in thinner layers to reduce the resistance of the product to later forming and shaping operations in the shaping section 30'. Another major difference in the operation of the extruder is the lack of grooves on one side of the composite strip 26'. This is illustrated by the composite strip 26', downstream from the extruder 22'.

The prior art processes further use a shaping section 30' that also differs from that of the present invention. First, there are no heating means disposed to induce fusion of the thermoplastic material because there are no grooves in the thermoplastic material being closed. Second, the opposed pairs of forming and shaping rolls 32' induce much less severe deformations of the composite strip 26'. As shown by the cross section of the shaped composite strip 34', downstream from the shaping section 30', the prior art is capable of forming only simple C-shaped trim strip without the acute bends of the product produced by the present invention. Conventional processes normally use thermoplastic materials such as clear PVC, CAB or the like.

In addition, the prior art processes may include the step of cooling the shaped composite strip 34' to remove heat generated in the shaping section that would make the shaped product pliable enough to lose the predetermined final cross sectional shape. FIG. 4 includes cooling means 36 disposed to spray the shaped composite strip 34' with a coolant.

It will be apparent to those skilled in the art that various modifications and variations could be made in the process of the invention without departing from the scope of the invention, as set out in the appended claims.

We claim:

1. A process for forming a decorative strip comprised of an elongated metal strip and a thermoplastic portion affixed thereto, comprising the steps of:
    (a) supplying and transporting a continuous length of said metal strip;
    (b) extruding thermoplastic material onto said strip while transporting said strip, said strip being at least partially surrounded by said material;
    (c) forming said material around said strip to a first predetermined cross sectional shape, said shape including at least one longitudinal groove in said material; and
    (d) sequentially shaping said strip and said material surrounding said strip by bending said strip and said material to a second predetermined cross sectional shape, said strip being bent longitudinally at a location adjacent the root of said groove, thereby closing said groove, said shaping step including heating of said thermoplastic material to induce fusion of said material where said material on one side of said groove is in contact with material on the other side of said groove.

2. The process of claim 1 wherein said process includes the step of cooling said thermoplastic material after said shaping step.

3. The process of claim 1 wherein said process includes the step of applying adhesive to at least one side of said metal strip prior to extruding said thermoplastic material onto said strip.

4. The process of claim 3 wherein said adhesive is applied to both sides of said strip.

5. The process of claim 4 wherein said strip consists essentially of aluminum.

6. The process of claim 3 wherein said adhesive is applied only to one side of said strip, said material adjacent said one side receiving said adhesive also receiving at least one groove, said material adjacent the other side of said strip being ultimately removed from said strip to expose the surface of said strip not receiving said adhesive.

7. The process of claim 6 wherein said metal strip is stainless steel.

* * * * *